United States Patent Office 2,805,167
Patented Sept. 3, 1957

2,805,167

SYNTHETIC SPINEL REFRACTORY PRODUCTS

Donald O. McCreight, Library, and Raymond E. Birch, Pittsburgh, Pa., assignors to Harbison-Walker Refractories Company, Pittsburgh, Pa., a corporation of Pennsylvania No Drawing. Application May 18, 1954, Serial No. 430,746

8 Claims. (Cl. 106—62)

This invention relates to synthetic magnesium aluminate spinel refractory grain, and to refractory products made from such grain.

The terms "spinel" and "magnesium aluminate spinel" as used herein contemplate only the composition generally designated in those ways, namely $MgO.Al_2O_3$, and those terms are to be so understood when used in the following specification and claims as contemplating compositions corresponding, substantially, to that formula.

Those familiar with the refractory field know that a usable refractory article of magnesium aluminate spinel can not be made directly by sintering magnesium and aluminum compounds together because the fine particle size of the components needed for complete reaction does not yield a structural character suited to refractory uses. Therefore, to make a refractory spinel article a strong dense spinel grain is required. Following normal practices it would be expected that this could be accomplished by sintering at very high temperatures a mixture of the finely divided oxides of magnesium and aluminum. However, it has been found that when this is done the resulting spinel instead of being dense and strong is highly porous and completely unsatisfactory for producing spinel refractories. For example, when 70.4 parts by weight of No. 1 alumina ($Al_2O_3$) and 29.6 parts of dead burned magnesite (MgO) of the following analyses are ground to pass a 150 mesh screen, intimately mixed, pressed into a shape, and burned at cone 32, the resulting material has a true specific gravity of 3.55. This indicates a high degree of conversion of the oxides to spinel inasmuch as the true specific gravity of magnesium aluminate spinel (3.53 to 3.60) is much lower than the true specific gravity of the chemically uncombined mixture of oxides (3.86). However, despite this high degree of conversion, the grain has a true porosity of 45.1 percent, and as those familiar with the refractory art realize, such grain is accordingly unsuitable for producing refractory shapes capable of carrying heavy loads and free from high shrinkage at elevated temperatures.

When this same magnesia is mixed with bauxite, an impure hydrous aluminum oxide, of the following composition, and treated in the manner just described, there is again substantially complete conversion to spinel as indicated by the true specific gravity of 3.47. This product has a lower true porosity of 16.5 percent due, presumably, to the fluxing action of low melting siliceous eutectics or glasses formed from the impurities in the bauxite. Despite the low porosity of this product, such low melting phases decrease the refractoriness of the grain and are injurious to other desirable qualities so that this spinel is likewise unsuited to the production of shaped refractories.

| Oxides | Magnesia, percent | No. 1 Alumina, percent | Bauxite, percent |
|---|---|---|---|
| Magnesia (MgO) | 92.7 | | |
| Alumina ($Al_2O_3$) | 0.8 | 99 | 58.9 |
| Silica ($SiO_2$) | 3.2 | | 7.1 |
| Iron Oxide ($Fe_2O_3$) | 1.5 | | 2.1 |
| Lime (CaO) | 1.5 | | |
| Titania ($TiO_2$) | | | 2.0 |
| Ignition Loss | 0.1 | | 30.0 |

For the reasons just explained, in the production of this $MgO.Al_2O_3$ spinel it is customary to completely fuse, or melt, the component magnesium and aluminum oxides. In this way, a relatively pure spinel of very low porosity may be produced but the practice is objectionable in that it involves the use of expensive electric furnaces or equivalent equipment, which have relatively little other use in the average refractories plant, plus the cost of power used for the melting operation. For these reasons spinel has found very little use as a refractory.

It is among the objects of this invention to provide a method of preparing synthetic magnesium aluminate spinel refractory grain of very low true porosity and of excellent refractoriness that is simple, easily performed with readily available materials and equipment commonly used in the refractories industry, and that avoids the disadvantages alluded to above.

Another object is to provide synthetic spinel grain that is hard, of very low true porosity, of high purity, and that is excellently adapted to the production of refractory shapes and other refractory products possessing high refractoriness and the ability to withstand load at elevated temperatures.

Still another object is to provide a method of producing and converting such spinel grain to refractory products of various types and uses.

Other objects will appear from the following specification:

This invention is predicated upon our discovery that magnesium aluminate spinel in accordance with the stated objects of the invention can be produced from magnesium hydroxide, or hydrate, $Mg(OH)_2$, and aluminum hydroxide, or hydrate, $Al(OH)_3$, by intimately mixing them, most suitably in the wet state, partially drying the mixture, forming it into shapes, and burning the shapes in conventional apparatus used for that purpose in the refractory art. In this way, we produce a hard magnesium aluminate spinel grain that is of exceptionally low true porosity, that is relatively pure, depending upon the composition of the magnesium and aluminum hydroxides used, and that is of excellent refractoriness, while avoiding the disadvantages of the prior sintering and electric melting processes.

Spinel grain prepared in this way can be used, as we have demonstrated, to form refractory shapes and other refractory products of excellent refractory and thermal properties. From this it will be seen that in addition to forming the spinel from hydroxides of magnesium and aluminum the present invention differs from prior practices in which shaped spinel refractories were proposed to be produced directly, in that in the present practice the individual refractory grain is first prepared and is then subsequently converted into refractory articles.

In the practice of the invention the hydroxides should be of fine particle size and in a high state of purity both as exemplified by the following examples of actual practice.

*Example 1.*—This involved the use of magnesium hydroxide precipitated from sea water by high purity calcined dolomite and washed to remove the soluble salts, and thickened, and aluminum hydroxide made by the Bayer process. These materials had the following chemical analysis:

| Oxide | Magnesium Hydroxide, Percent | Aluminum Hydroxide, Percent |
|---|---|---|
| Alumina ($Al_2O_3$) | 0.1 | 64.4 |
| Silica ($SiO_2$) | 0.8 | 0.1 |
| Iron Oxide ($Fe_2O_3$) | 0.6 | |
| Lime (CaO) | 2.3 | |
| Magnesia (MgO) | 64.7 | |
| Soda ($Na_2O$) | | 0.5 |
| Ignition Loss | 31.6 | 34.7 |

The hydroxides were combined in spinel proportions to supply, by weight, 28.2 percent of MgO and 71.8 percent of $Al_2O_3$, and wet mixed in a Day mechanical mixer using sufficient water to give a good consistency for thorough mixing. After mixing one hour the wet material was spread on pallets and allowed to dry until the moisture content was less than required for pressing. The partially dried material was then mixed in a Clearfield mixer with sufficient water to give good pressing consistency. It was then pressed under 4000 p. s. i. into shapes approximating 9 x 4.5 x 2.5 inches which were then dried and burned. The burning schedule involved six hours from room temperature to 3000° F., 5 hours hold at 3000° F., when cone 32 tipped. The product had a true specific gravity of 3.57, indicating an essentially complete conversion to magnesium aluminate spinel. It had a true porosity of 7.3 percent, and brick made from it had a bulk density of 165 lbs. per cu. ft. As appears from the foregoing analyses the product was likewise of high purity, thus insuring maximum refractoriness because of the very low content of impurities, more particularly silica and soda.

*Example 2.*—This was the same as Example 1 through the initial steps of wet mixing and partial drying. The partially dried mass was then rewetted and mixed in a Day mixer followed by extrusion from a vacuum auger machine under a vacuum of 25 inches of mercury. The extruded material was dried and burned in the same schedule as in Example 1. This spinel also had a true specific gravity of 3.57 but its true porosity was somewhat lower, namely, 6.4 percent.

Chemical analysis of the magnesium aluminate spinel prepared by the foregoing examples follows:

| | |
|---|---|
| Silica ($SiO_2$) | 0.88 |
| Alumina ($Al_2O_3$) | 70.95 |
| Titania ($TiO_2$) | 0.05 |
| Iron Oxide ($Fe_2O_3$) | 0.60 |
| Lime (CaO) | 0.90 |
| Magnesia (MgO) | 26.56 |
| Soda ($Na_2O$) | 0.01 |
| Potash ($K_2O$) | 0.00 |
| Lithia ($Li_2O$) | 0.01 |

*Example 3.*—In this case the magnesium hydroxide used in Example 1 was blended in spinel proportions with a somewhat less pure aluminum hydroxide which is a by-product of the manufacture of chromium salts and which had the following analysis:

| Oxide | Percent |
|---|---|
| Alumina ($Al_2O_3$) | 74.4 |
| Silica ($SiO_2$) | 0.6 |
| Iron Oxide ($Fe_2O_3$) | 0.1 |
| Soda ($Na_2O$) | 4.0 |
| Sodium Chromate ($Na_2CrO_4$) | 0.4 |
| Ignition Loss | 20.5 |

The mixture was processed and fired following exactly the procedure of Example 1. The resultant spinel grain had a true specific gravity of 3.57, a true porosity of 11.5 percent, and brick made from it had a bulk density of 168 lbs. per cu. ft.

*Example 4.*—In this instance the materials used in Example 3 were mixed, extruded and fired, using exactly the procedure for Example 2. The spinel grain thus produced had a true specific gravity of 3.57 and a true porosity of 14.9 percent. Its chemical analysis was as follows:

| | |
|---|---|
| Silica ($SiO_2$) | 2.14 |
| Alumina ($Al_2O_3$) | 65.74 |
| Titania ($TiO_2$) | 0.04 |
| Iron Oxide ($Fe_2O_3$) | 0.76 |
| Chromic Oxide ($Cr_2O_3$) | 1.62 |
| Lime (CaO) | 1.10 |
| Magnesia (MgO) | 27.59 |
| Vanadium Pentoxide ($V_2O_5$) | 0.50 |
| Soda ($Na_2O$) | 0.33 |
| Potash ($K_2O$) | 0.00 |
| Lithia ($Li_2O$) | 0.01 |

It will be noted that the $Na_2O$ content is lower than might be expected from the analysis of the aluminum hydroxide. This is because of volatilization of the alkali in the firing process.

Although the foregoing examples represent the methods we prefer at present for the preparation for spinel grain in accordance with this invention, other procedures may be used. For example, the hydroxides may be in the form of slurries as produced, the slurries may be partially dried, or the dry hydroxides may be dry mixed instead of wet mixed before preparing for pressing into shapes, or the wet mixed material may be pressed, extruded or pelletized without first being partially dried. For instance, slurries such as just referred to may be fed to rotary kilns in which the agglomeration that occurs as the material passes into and through the firing zone will constitute the shaping step of our invention, with the agglomerates being fired in the same operation. Firing schedules other than that described may be used also. All such factors are within the skill and experience of those familiar with the refractory art.

An important feature of the invention is that the resulting refractory grain contains at least 90 percent of the oxides of magnesium and aluminum, MgO plus $Al_2O_3$. Thus, the refractory spinel grain prepared by Examples 1 and 2 contains in excess of 97 percent of oxides of magnesium and aluminum, while that produced under Examples 3 and 4 contains in excess of 93 percent. Preferably the grain consists of pure, or substantially pure, spinel, MgO.$Al_2O_3$, e. g., in accordance with the foregoing examples. However, grains of low true porosity and high density and refractoriness can be made by following the method of our invention even where excess magnesia is present as periclase. Such products may contain up to 50 percent periclase with the remainder spinel. Such spinel grains are admirably adapted for conversion to all types of refractory articles, examples being spinel brick and other shapes, ramming mixes, pebbles for pebble heating procedures, catalyst carriers, and others.

This grain, which may be considered to be a neutral refractory, may also be used in combination with such other refractory materials as forsterite (2MgO.$SiO_2$), refractory grades of chrome ore, alumina, or periclase.

The exact procedure used in converting refractory spinel grain made in accordance with this invention to refractory articles will depend for the most part upon the particular article to be produced, as just indicated, and also upon particular operating preferences. However, as exemplifying this aspect of the invention, refractory spinel grain in accordance with Examples 1 or 3 is crushed, ground, and sized to provide a batch of approximately the following proportions:

| | Percent |
|---|---|
| Minus 6+10 mesh | 11 |
| Minus 10+28 mesh | 24 |
| Minus 28+65 mesh | 16 |
| Minus 65 mesh | 49 |

This batch is blended in a wet pan mixer, such as a Clearfield mixer, with about 3 percent of water and 1 percent of lignin binder. After the grains have been uniformly blended and wet, the batch is pressed at 4000 p. s. i. into 9 x 4½ x 2½ inch shapes which after drying are fired to the following schedule:

86 hours to 2685° F.
10 hours hold at that temperature
Cone 18 down

Bricks made in this manner from the refractory grain of any of the foregoing examples are capable of withstanding a load of 25 p. s. i. to a temperature in excess of 3120° F. without collapse or failure. After being reheated to 3000° F. they show negligible change in size and no evidence of surface wetting or sticking together.

As will appear from the foregoing examples, the hydroxides of alumina and magnesia used in the practice of the invention should be of high purity. For most purposes it is preferred that their purity be such that the refractory grain will contain not over about 1 percent of lime expressed as CaO. To minimize the formation of low melting silicates that would detract from the refractoriness and load bearing qualities of the refractory products of this invention, the content of silica ($SiO_2$) should be low, e. g., not over about 3 percent. We now believe that iron oxide up to 2 or 3 percent, expressed as $Fe_2O_3$, present as an impurity does no particular harm insofar as refractoriness is concerned although it is objectionable in any substantial amount in spinel refractories, such as tank blocks, to be used in contact with molten glass because of the tendency of iron to cause coloration of glass.

Refractory products in accordance with this invention may be used wherever their chemical characteristics, high refractoriness and load bearing capability adapt them, and for example, they are useful for purposes to which chrome refractories are put.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. That method of making refractory shapes comprising mixing magnesium hydroxide and aluminum hydroxide in proportions corresponding substantially to $MgO.Al_2O_3$ with sufficient water for good mixing, drying the mix to a water content less than required for forming shapes, then mixing the dried material with water to forming consistency, then forming shapes therefrom, and burning the shapes to form refractory spinel grain of low true porosity.

2. A method according to claim 1, said grain containing at least about 90 percent of $MgO.Al_2O_3$.

3. A method according to claim 1, said grain containing not over about 3 percent of silica.

4. A method according to claim 3, said grain containing not over about 1 percent of lime as CaO.

5. That method of making refractory shapes comprising mixing magnesium hydroxide and aluminum hydroxide in proportions corresponding substantially to $MgO.Al_2O_3$ with sufficient water for good mixing, drying the mix to a water content less than required for forming shapes, then mixing the dried material with water to forming consistency, then forming shapes therefrom, and burning the shapes to form refractory grain containing at least about 90 percent magnesium aluminate of low true porosity, crushing said grain, forming a blended batch of the crushed grain, water and binder for pressing, pressing shapes from said batch, and burning said shapes.

6. That method of making refractory shapes comprising mixing magnesium hydroxide and aluminum hydroxide with sufficient water for good mixing, drying the mix to a water content less than required for forming shapes, then mixing the dried material with water to forming consistency, then forming shapes therefrom, and burning the shapes to form refractory grain of low true porosity, said hydroxides being mixed in proportions such that the grain contains up to 50 percent of periclase and the remainder substantially all magnesium aluminate spinel.

7. A method according to claim 6, the grain containing not over about 3 percent of silica, and not over about 1 percent of lime as CaO.

8. A method according to claim 7 including the steps of crushing said grain, forming a blended batch of the crushed grain, water and binder for pressing, pressing shapes from said batch, and burning said shapes.

References Cited in the file of this patent

UNITED STATES PATENTS

| 1,871,056 | Heiser | Aug. 9, 1932 |
| 2,045,494 | Riddle | June 23, 1936 |
| 2,618,566 | Robinson | Nov. 18, 1952 |

FOREIGN PATENTS

| 697,231 | Great Britain | 1953 |
| 400,984 | Great Britain | Nov. 6, 1933 |

OTHER REFERENCES

Mellor: "Comprehensive Treatise on Inorganic and Theoretical Chemistry," vol. 5, 1924, pages 294–296, Longmans, Green and Co., New York City.